United States Patent
Wang et al.

(10) Patent No.: US 11,443,556 B2
(45) Date of Patent: Sep. 13, 2022

(54) METHOD, DEVICE, AND PROGRAM PRODUCT FOR KEYSTROKE PATTERN ANALYSIS

(71) Applicant: EMC IP Holding Company LLC, Hopkinton, MA (US)

(72) Inventors: Zijia Wang, Shanghai (CN); Qiang Chen, Shanghai (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/106,551

(22) Filed: Nov. 30, 2020

(65) Prior Publication Data

US 2022/0138457 A1    May 5, 2022

(30) Foreign Application Priority Data

Oct. 30, 2020   (CN) .......................... 202011192818.X

(51) Int. Cl.
*G06V 40/20*   (2022.01)
*G06F 7/02*    (2006.01)
(Continued)

(52) U.S. Cl.
CPC .............. *G06V 40/20* (2022.01); *G06F 3/02* (2013.01); *G06K 9/6256* (2013.01)

(58) Field of Classification Search
CPC ......... G06V 40/20; G06F 3/02; G06K 9/6256
See application file for complete search history.

(56) References Cited

U.S. PATENT DOCUMENTS 4,621,334 A * 11/1986 Garcia ................ G06F 21/32
                                                  382/115
4,805,222 A *  2/1989 Young ................ G06F 21/316
                                                  382/115

(Continued)

OTHER PUBLICATIONS

Y. Zhao, "Learning User Keystroke Patterns for Authentication," World Academy of Science, Engineering and Technology, International Journal of Computer and Information Engineering, vol. 2, No. 2, 2008.

(Continued)

*Primary Examiner* — Albert K Wong
(74) *Attorney, Agent, or Firm* — Ryan, Mason & Lewis, LLP

(57) ABSTRACT

Embodiments of the present disclosure provide a method, a device, and a program product for keystroke pattern analysis. The method includes: acquiring keystroke information of a user on an electronic device, wherein the keystroke information indicates a sequence of characters that are typed sequentially and time information related to the typing of corresponding characters in the sequence of characters; encoding corresponding characters in the sequence of characters respectively into vectorized representations to obtain a sequence of vectorized representations, wherein different characters are encoded into different vectorized representations; superimposing the time information related to the typing of corresponding characters in the sequence of characters respectively to corresponding vectorized representations in the sequence of vectorized representations to obtain a sequence of time-based vectorized representations; and verifying a keystroke pattern of the user by extracting keystroke behavior features from the sequence of time-based vectorized representations.

20 Claims, 5 Drawing Sheets

(51) Int. Cl.
    *G06K 9/62*     (2022.01)
    *G06F 3/02*     (2006.01)

(56) References Cited

U.S. PATENT DOCUMENTS

| | | | | |
|---|---|---|---|---|
| 5,557,686 | A * | 9/1996 | Brown | G07C 9/33 |
| | | | | 382/115 |
| 6,151,593 | A * | 11/2000 | Cho | G06F 21/32 |
| | | | | 706/16 |
| 7,260,837 | B2 * | 8/2007 | Abraham | G06Q 20/3821 |
| | | | | 726/4 |
| 8,533,486 | B1 * | 9/2013 | Stark | H04L 63/0861 |
| | | | | 713/186 |
| 8,583,574 | B2 * | 11/2013 | Rodriguez | H04L 9/3226 |
| | | | | 706/15 |
| 2004/0187037 | A1 * | 9/2004 | Checco | G06F 21/32 |
| | | | | 726/7 |
| 2007/0234056 | A1 * | 10/2007 | Mani | G06F 21/32 |
| | | | | 713/172 |
| 2009/0049555 | A1 * | 2/2009 | Cho | G06F 21/31 |
| | | | | 726/26 |

OTHER PUBLICATIONS

S. Hochreiter et al., "Long Short-Term Memory," Neural Computation, vol. 9, No. 8, 1997, 32 pages.

P. Malhotra et al., "Long Short Term Memory Networks for Anomaly Detection in Time Series," Proceedings of European Symposium on Artificial Neural Networks, Computational Intelligence and Machine Learning, Apr. 22-24, 2015, Belgium, 6 pages.

\* cited by examiner

METHOD, DEVICE, AND PROGRAM PRODUCT FOR KEYSTROKE PATTERN ANALYSIS

RELATED APPLICATION(S)

The present application claims priority to Chinese Patent Application No. 202011192818.X, filed Oct. 30, 2020, and entitled "Method, Device, and Program Product for Keystroke Pattern Analysis," which is incorporated by reference herein in its entirety.

FIELD

Embodiments of the present disclosure relate to the field of computer technologies, and in particular, to a method, a device, and a computer program product for keystroke pattern analysis.

BACKGROUND

When a user uses an electronic device, such as a mobile phone or a notebook computer, it is necessary to check whether the user is a legal and valid user of the device. In general, the authentication process consists of three phases, namely, access request, information extraction, and authentication. A conventional authentication system performs authentication based on a user name and a password. Verification of a user's identity is achieved by comparing text entered by the user, such as a user name and a password, with corresponding information of valid users pre-stored in a database. Currently, text-based identity verification systems are still the mainstream technology. However, it turns out that this is a relatively weak security mechanism with a high risk of information leakage. In addition, authentication information may be lost. For example, the user name and the password may be forgotten after a period of time or may be stolen.

Currently, biometric feature authentication systems are a very active area of research. The term "biometric feature" refers to an individual-based unique physiological or behavioral feature. Biometric features may include "physiological biometric features" and "behavioral biometric features." Fingerprint, iris, face, etc. are physiological biometric features that are stable and identical to one individual. Voice tone, gait, keystroke, etc., are typical behavioral biometric features. Compared with physiological biometric features, behavioral biometric features are more flexible.

Physiological feature recognition may be considered as a kind of pattern recognition. Keystroke dynamics mainly involves keystroke pattern recognition technology, which monitors a user's keyboard input, acquires information related to the user's keystrokes on the keyboard, analyzes a keystroke pattern of the user, and uses this as a basis to identify the user's identity. Compared with physiological features such as fingerprints and irises, the recognition technology based on keystroke behavior features has significant advantages, so it is being widely studied and applied.

SUMMARY

The embodiments of the present disclosure provide a solution for keystroke pattern analysis.

In a first aspect of the present disclosure, a method for keystroke pattern analysis is provided. The method includes acquiring keystroke information of a user on an electronic device, wherein the keystroke information indicates a sequence of characters that are typed sequentially and time information related to the typing of corresponding characters in the sequence of characters; encoding corresponding characters in the sequence of characters respectively into vectorized representations to obtain a sequence of vectorized representations, wherein different characters are encoded into different vectorized representations; superimposing the time information related to the typing of corresponding characters in the sequence of characters respectively to corresponding vectorized representations in the sequence of vectorized representations to obtain a sequence of time-based vectorized representations; and verifying a keystroke pattern of the user by extracting keystroke behavior features from the sequence of time-based vectorized representations.

In a second aspect of the present disclosure, an electronic device is provided. The electronic device includes: at least one processor; and at least one memory storing computer program instructions, wherein the at least one memory and the computer program instructions are configured to cause, together with the at least one processor, the electronic device to perform actions. The actions include acquiring keystroke information of a user on an electronic device, wherein the keystroke information indicates a sequence of characters that are typed sequentially and time information related to the typing of corresponding characters in the sequence of characters; encoding corresponding characters in the sequence of characters respectively into vectorized representations to obtain a sequence of vectorized representations, wherein different characters are encoded into different vectorized representations; superimposing the time information related to the typing of corresponding characters in the sequence of characters respectively to corresponding vectorized representations in the sequence of vectorized representations to obtain a sequence of time-based vectorized representations; and verifying a keystroke pattern of the user by extracting keystroke behavior features from the sequence of time-based vectorized representations.

In a third aspect of the present disclosure, a computer program product is provided. The computer program product is tangibly stored on a non-transitory computer-readable medium and includes machine-executable instructions, wherein the machine-executable instructions, when executed, cause a device to acquire keystroke information of a user on an electronic device, wherein the keystroke information indicates a sequence of characters that are typed sequentially and time information related to the typing of corresponding characters in the sequence of characters; encode corresponding characters in the sequence of characters respectively into vectorized representations to obtain a sequence of vectorized representations, wherein different characters are encoded into different vectorized representations; superimpose the time information related to the typing of corresponding characters in the sequence of characters respectively to corresponding vectorized representations in the sequence of vectorized representations to obtain a sequence of time-based vectorized representations; and verify a keystroke pattern of the user by extracting keystroke behavior features from the sequence of time-based vectorized representations.

This Summary is provided in order to introduce the selection of concepts in a simplified form, which will be further described in the detailed description below. The Summary is not intended to identify key features or primary features of the present disclosure, nor is it intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Figure 1:
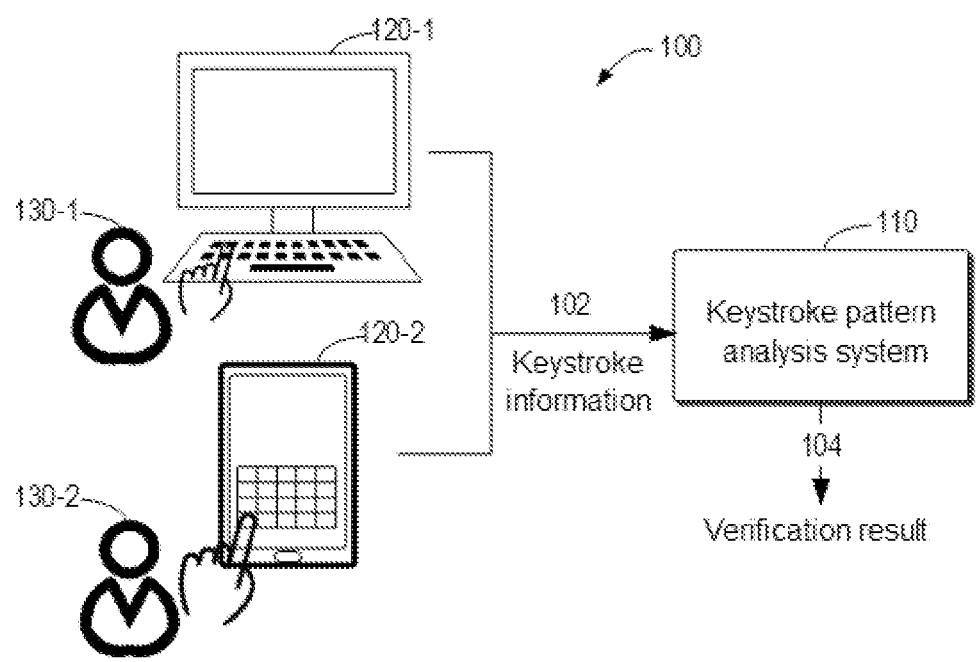
FIG. 1 illustrates a schematic diagram of an environment in which the embodiments of the present disclosure can be implemented.

The principles of the present disclosure will be described below with reference to some example embodiments shown in the accompanying drawings. Although illustrative embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may also be included below.

As used herein, the term "machine learning" refers to processing involving high performance computing, machine learning, and artificial intelligence algorithms. The term "machine learning model" herein may also be referred to as "learning model," "learning network," "network model," or "model." "Neural network" or "neural network model" is a deep learning model. To summarize, a machine learning model is capable of receiving input data, performing predictions based on the input data, and outputting prediction results.

The machine learning model may include a plurality of processing layers, each processing layer having a plurality of processing units. The processing unit is sometimes referred to as a convolutional kernel. In a convolutional layer of a convolutional neural network (CNN), processing units are referred to as convolutional kernels or convolutional filters. The processing units in each processing layer perform a corresponding change on an input of that processing layer based on corresponding parameters. An output of the processing layer is provided as an input to the next processing layer. The input of the first processing layer of the machine learning model is the model input of the machine learning model, and the output of the last processing layer is the model output of the machine learning model. Inputs of intermediate processing layers are sometimes referred to as features extracted by the machine learning model. Values of all parameters of processing units of the machine learning model form a set of parameter values of the machine learning model.

Machine learning can mainly be divided into three phases, namely, a training phase, a testing phase, and an application phase (also referred to as an inference phase). In the training stage, a given machine learning model may be trained by using a large number of training samples, and the training keeps on iterating until the machine learning model can obtain consistent reasoning from the training samples that is similar to the reasoning that can be made by human intelligence. Through training, the machine learning model may be considered as being capable of learning mapping or association relationships between inputs and outputs from training data. After training, a set of parameter values of the machine learning model is determined. In the testing stage, the trained machine learning model may be tested by using a test sample to determine the performance of the machine learning model. In the application stage, the machine learning model may be configured to process actual input data based on the set of parameter values obtained by training, so as to provide a corresponding output.

Example embodiments of the present disclosure mainly relate to verification based on a keystroke pattern. The keystroke pattern is a behavioral biometric feature of a user, which has significant advantages over face, fingerprint, iris, and other physiological features. Firstly, information used for verification can be obtained from keyboard inputs without additional instruments and devices. Information related to physiological features often requires specialized devices for collection, such as cameras for facial image collection, fingerprint scanners, iris scanners, etc. Secondly, keystroke behavior features of a user do not need to be memorized and are difficult to imitate and falsify, so the risk of forgetting and leaking verification information is low. In addition, after a user logs on to an electronic device, keystroke information generated by the user through operating the electronic device may still be continuously captured, so that the legality of the user can be continuously monitored based on the keystroke behavior features.

When performing authentication based on a keystroke pattern, the main focus is on how to extract features from collected keystroke information and how to perform classification-based authentication to determine the validity of a user's identity. Many current methods for keystroke pattern analysis have shortcomings in performance. For example, the construction of some classification models requires artificially defining features to extract corresponding features from keystroke information. The accuracy of such classification models relies on expert knowledge and is inefficient. Some methods of using neural networks to automatically extract features have also been proposed, but difficulties are still encountered in feature characterization, since keystroke information is a kind of time-ordered information. Therefore, a need exists for a more complete and effective way to perform keystroke behavior feature analysis for implementation of keystroke pattern analysis.

According to some embodiments of the present disclosure, a solution for keystroke pattern analysis is provided. In this solution, a sequence of characters indicated by keystroke information and time information related to the typing of each character are co-encoded into a sequence of vectorized representations. The sequence of vectorized representations is time-ordered, wherein the order of the vectorized representations corresponds to the order in which characters in the sequence of characters are typed. Therefore, the obtained sequence of vectorized representations is also referred to as a sequence of time-based vectorized representations. When performing the keystroke pattern analysis, keystroke behavior features are extracted from the sequence of time-based vectorized representations to verify a keystroke pattern of a user. The sequence of vectorized representations fused with time information and character information is helpful for fast and effective feature extraction, thereby improving the efficiency and accuracy of keystroke pattern analysis. Furthermore, such a sequence of vectorized representations is also particularly useful for extracting features through a machine learning model based on time sequence information.

FIG. 1 illustrates a schematic diagram of environment 100 in which the embodiments of the present disclosure can be implemented. As shown in FIG. 1, environment 100 includes keystroke pattern analysis system 110. Keystroke pattern analysis system 110 is configured to analyze a keystroke pattern of a user based on keystroke information 102 of the user, so that it can then verify the validity of the user's identity and provide verification result 104.

As shown in FIG. 1, keystroke pattern analysis system 110 can obtain keystroke information 102 generated by user 130-1 through keystroke inputs on electronic device 120-1, or keystroke information 102 generated by user 130-2 through keystroke inputs on electronic device 120-2. Keystroke information 102 is related to the typing by the user and is generated by the user through typing information into the electronic device via a hardware keyboard, a virtual keyboard, or by other means. In the example of FIG. 1, electronic device 120-1 is shown as a desktop computer equipped with a hardware keyboard that user 130-1 can use to implement typing. This example also shows electronic device 120-2 with a touch display, wherein user 130-2 can implement typing by pressing a virtual keyboard on the display.

For ease of discussion, hereinafter, users 130-1 and 130-2 may be collectively or individually referred to as user 130, and electronic devices 120-1 and 120-2 on which user 130 types information may be collectively or individually referred to as electronic device 120.

It should be understood that FIG. 1 only gives some examples regarding electronic device 120 and the way of typing information. Electronic device 120 that supports the user in performing typing may include any type of mobile terminals, fixed terminals, or portable terminals, including a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination of the foregoing, including accessories and peripherals of such devices or any combination thereof. Electronic device 120 may also include a user-specific interface (such as "wearable" circuit) capable of supporting any type.

Keystroke pattern analysis system 110 may include or be implemented as any computing system or server with computing power. In some cases, keystroke pattern analysis system 110 may be a computing device with limited processing and/or storage resources, for example, a terminal device, such as a mobile phone, a laptop computer, a desktop computer, a tablet computer, an edge computing device of the Internet of Things (IoT), an edge gateway, and the like. In some embodiments, keystroke pattern analysis system 110 may also be a service end device. For example, it may be a server, a mainframe, a cloud, and the like.

Although shown as a discrete system in FIG. 1, in some embodiments, keystroke pattern analysis system 110 may be integrated into various electronic devices 120 to perform valid user identity verification for the electronic device.

Example embodiments of the present disclosure will be discussed in more detail below with reference to the accompanying drawings.

Figure 2:
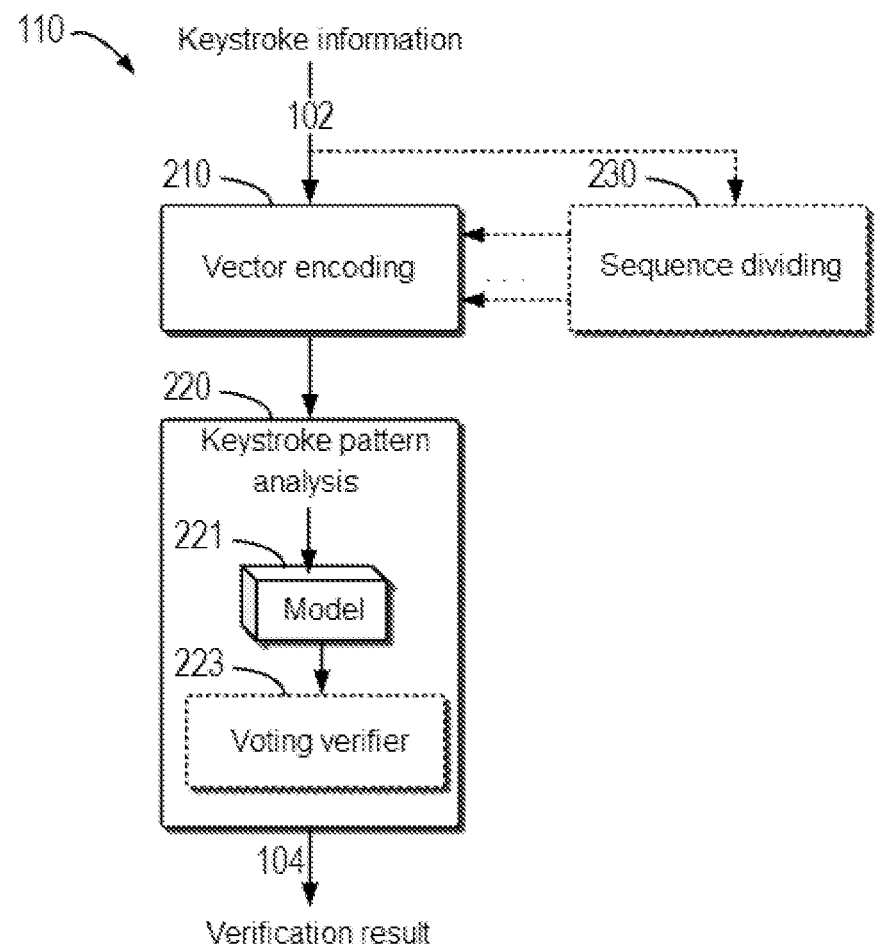
FIG. 2 illustrates a block diagram of a keystroke pattern analysis system according to some embodiments of the present disclosure.

Refer first to FIG. 2, which illustrates a block diagram of a keystroke pattern analysis system according to some embodiments of the present disclosure.

For ease of discussion, keystroke pattern analysis will be discussed with reference to FIG. 1, and keystroke pattern analysis system 110 of FIG. 1 is thus shown in FIG. 2, which is configured to analyze, based on keystroke information 102 of user 130 on electronic device 120, a keystroke pattern of the user, so that it can then verify the validity of identity of the user and provide verification result 104. In some embodiments, keystroke pattern analysis system 110 may be configured to perform keystroke pattern analysis based on a specific request. In some embodiments, keystroke pattern analysis system 110 may continuously or periodically acquire keystroke information of user 130 on electronic device 120 to continuously perform keystroke pattern verification.

As shown in FIG. 2, keystroke pattern analysis system 110 includes vector encoding part 210 and keystroke pattern analysis part 220. Vector encoding part 210 is configured to encode keystroke information 102 into vectorized representations for subsequent analysis. In an example embodiment of the present disclosure, keystroke information 102 includes character information and time information. The character information indicates a sequence of characters that are typed sequentially, and the sequence may include a plurality of characters. The time information indicates time information related to the typing of corresponding characters in the sequence of characters. Therefore, for each character in the sequence of characters, there can be corresponding time information.

Keystroke information 102 may be collected by electronic device 120 while user 130 is performing the typing of characters. During the collection, electronic device 120 may record characters that are sequentially typed by user 130 over a period of time, a time when the characters are typed (e.g., the time when keys corresponding to the characters are pressed), a time when the typing of the characters is released (e.g., the time when the keys corresponding to the characters are released), and so forth. The following Table 1 shows examples of collected keystroke information 102.

TABLE 1

Examples of keystroke information

| Character | Status | Time stamp |
|---|---|---|
| a | 1 | 1577947507.7771559 |
| a | 0 | 1577947507.8270708 |
| c | 1 | 1577947507.8971708 |
| ... | ... | ... |

In Table 1, the "Character" column includes characters corresponding to the keys pressed; the "Status" column indicates states corresponding to the typing of the characters, where "1" indicates that a character is typed and "0" indicates that the typing of the character is released; and the "Time stamp" column indicates the time when a character is typed or its typing is released. Note that the time stamp here is processed to be represented by a numerical value. Of course, any other time stamp representation is also possible, as long as it is able to distinguish different times. It should be understood that FIG. 1 only gives an example of keystroke information, and that characters typed by a user and related time information may also be indicated in other ways.

Time information used for keystroke pattern analysis may include one or more types of time related to the typing of characters. In some embodiments, for each character, the time information used for keystroke pattern analysis may include the time when the corresponding character is typed, for example, the time stamp corresponding to each character in Table 1 when the state is "1." In some embodiments, for each character, the time information may include the time when the corresponding character is released, for example, the time stamp corresponding to each character in Table 1 when the state is "0."

In some embodiments, alternatively or additionally, for each character, the time information may include a time difference between the typing of the character and the typing of an adjacent character (e.g., the previous character or the next character in the time sequence). The time difference may also be determined based on the time when the two characters are typed and/or the time when the typing is released. In one example, this time difference may be determined as a time difference between the time when the character is typed and the time when the adjacent character is typed. In another example, this time difference may be determined as a time difference between the time when the typing of the character is released and the time when the typing of the adjacent character is released. In a further example, the time difference may also be determined in other ways based on the time when the two characters are typed and the time when the typing is released.

In order to facilitate subsequent processing, vector encoding part 210 is configured to encode keystroke information 102 into a vectorized representation, wherein the vectorized representation includes a certain number of elements to form a vector of corresponding dimensions for indicating keystroke information 102. In keystroke information 102, the typing order of characters and the time related to the typing are very important for the keystroke pattern analysis. Therefore, when encoding keystroke information 102 into a vectorized representation, it is desirable to retain such time-ordered feature.

According to an embodiment of the present disclosure, vector encoding part 210 first encodes corresponding characters in the sequence of characters respectively into corresponding vectorized representations. Different characters are encoded into different vectorized representations to reflect differences between characters. The vectorized representations corresponding to the plurality of characters in the sequence of characters constitute a sequence of vectorized representations.

The vectorized representation of a character can be determined by a vector encoding method suitable for natural language processing. In some embodiments, vector encoding part 210 may encode a character into a corresponding vectorized representation by means of one-hot encoding, and this vectorized representation may also be referred to as a one-hot encoding representation or one-hot embedding representation of the character. To facilitate understanding, one-hot encoding will be firstly introduced briefly.

One-hot encoding, which can also be referred to as one-bit effective encoding, mainly uses multiple states to indicate different objects, wherein each state is independent of other states, and only one bit is valid at any time. In text processing, one-hot encoding can be used to encode text-related sequences, wherein different text units can indicate different objects, and the presence or absence of a text unit can indicate the state of an object. In an example, suppose that the following two sentences: "Have a good day" and "Have a great day" are to be encoded. Each word can be considered as a text unit. A vocabulary (denoted as V) can be constructed, where V includes multiple text units that will appear. Considering the above two sentences, the vocabulary V=Have, a, good, great, day. Each word in the vocabulary can be encoded into a one-hot encoding representation. The dimension of the one-hot encoding representation depends on the total number (for example, 5) of words in the vocabulary. In the one-hot encoding representation of each word, the element corresponding to the word is represented as 1, and the elements corresponding to other words are represented as 0. Therefore, the one-hot encoding representation of the above five words can be determined as the following Table 2:

TABLE 2

Example one-hot encoding representation

| Word | One-hot encoding representation |
|---|---|
| Have | [1, 0, 0, 0, 0] |
| a | [0, 1, 0, 0, 0] |
| good | [0, 0, 1, 0, 0] |
| great | [0, 0, 0, 1, 0] |
| day | [0, 0, 0, 0, 1] |

From the perspective of dimensional space, these five one-hot encoding representations indicate that in a five-dimensional space, each word occupies one dimension and is independent of the other dimensions, that is, it will not be projected along the other dimensions.

In the above example, one-hot encoding is performed by word. When performing one-hot encoding on characters of keystroke information, one-hot encoding can be performed by character, and the dimension of the one-hot encoding representation is related to the total number of characters that may possibly be typed. For example, suppose that there are 31 characters that can be typed on a keyboard of an electronic device, the one-hot encoding representation of each character includes a 31-dimensional vectorized representation where the element corresponding to the character takes the value 1, and the elements corresponding to other characters take the value 0.

In some embodiments, in addition to one-hot encoding, other encoding methods may also be used to encode different characters into different vectorized representations. For example, an element in a vectorized representation of a character can take a numerical value other than 0 and 1.

In order to also encode time information in keystroke information 102 into vectorized representations at the same time, after obtaining the sequence of vectorized representations corresponding to the characters in the sequence of characters, vector encoding part 210 can also superimpose the time information related to the typing of corresponding characters in the sequence of characters respectively to corresponding vectorized representations in the sequence of vectorized representations. Specifically, the time information related to the typing of each character is superimposed to the vectorized representation of that character. The vectorized representation superimposed with the time information is referred to herein as a time-based vectorized representation. For the sequence of characters, the time-based vectorized representations corresponding to the characters constitute the sequence of time-based vectorized representations.

In some embodiments, since the time information may be represented by a numerical value, such as the time information shown in the "Time Stamp" column of Table 1, vector encoding part 210 may superimpose the numerical value representing the time information corresponding to each character to each numerical value in the vectorized representation of that character. For example, the numerical value representing the time information can be multiplied by the vectorized representation of the character to obtain the time-based vectorized representation.

Figure 3:
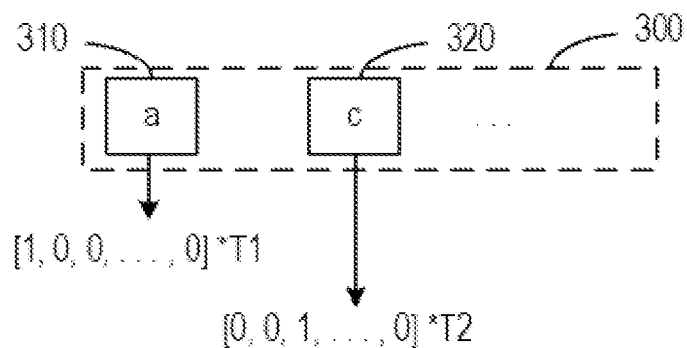
FIG. 3 illustrates an example of a sequence of time-based vectorized representations according to some embodiments of the present disclosure.

FIG. 3 illustrates an example of a sequence of time-based vectorized representations. In this example, sequence of characters 300 includes character "a" 310, character "c" 320, and so on. Character 310 is encoded into one-hot encoding representation [1, 0, 0, . . . , 0], and character 320 is also encoded into one-hot encoding representation [0, 0, 1, . . . , 0]. The dimension of the one-hot encoding representation (that is, the total number of elements therein) can be preset, for example, to the total number (for example, 0) of characters that can be typed. Numerical representations corresponding to the time information (denoted as "T1" and "T2" in the figure, respectively) of characters 310 and 320 can be superimposed to the one-hot encoding representations of corresponding characters to obtain a time-based vectorized representation corresponding to each character.

Since the sequence of characters and the time information are encoded simultaneously, the sequence of time-based vectorized representations can be used for subsequent keystroke pattern analysis. Referring back to FIG. 2, keystroke pattern analysis part 220 is configured to extract keystroke behavior features of user 130 from the sequence of time-based vectorized representations for use to verify a keystroke pattern of the user.

Since the sequence of time-based vectorized representations respectively correspond to the sequence of characters typed by user 130, it is considered as being time-ordered. Keystroke pattern analysis part 220 can perform feature extraction using a method suitable for extracting features from time-ordered information. In some embodiments, keystroke pattern analysis part 220 may use trained keystroke pattern verification model 221 to perform feature extraction and verification. Keystroke pattern verification model 221 may be trained based on a machine learning or deep learning technology to be able to extract, from the sequence of time-based vectorized representations, features that help distinguish the keystroke pattern of the user, and perform verification from the extracted features.

Figure 4:
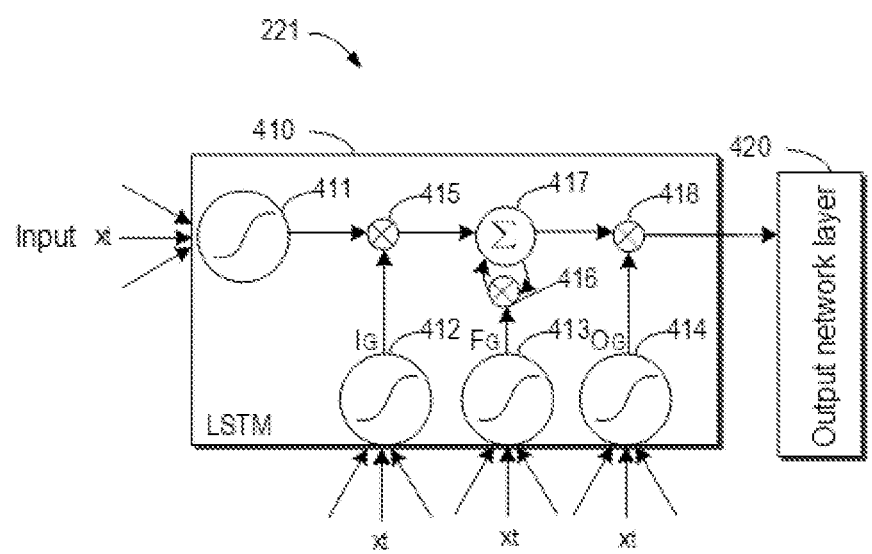
FIG. 4 illustrates a block diagram of an example architecture of a keystroke pattern verification model according to some embodiments of the present disclosure.

In some embodiments, keystroke pattern verification model 221 may include a model based on a long short-term memory (LSTM) unit. The LSTM unit is configured to perform feature extraction. Keystroke pattern verification model 221 may further include an output network layer for performing verification of the keystroke pattern of the user based on the extracted keystroke behavior features. FIG. 4 illustrates an example architecture of keystroke pattern verification model 221 based on an LSTM unit, which includes LSTM unit 410 and output network layer 420.

The LSTM unit is a time recurrent neural network. In the example of FIG. 4, LSTM unit 410 enhances an error flow flowing through a special unit referred to as a "memory unit" by using a plurality of multiplier gates 415, 416, and 418. Input gates 411 and 412 are used to sequentially receive one vectorized representation (referred to as "$x_t$") in the sequence of time-based vectorized representations. LSTM unit 410 further includes forget gate 413, output gate 414, and addition unit 417. The input gate, forget gate, and output gate are capable of preventing the memorized content from being destroyed by irrelevant inputs and outputs, thereby achieving the effect of long-term memory storage. LSTM unit 410 is able to learn the long-term correlation from a sequence, so keystroke pattern verification model 221 based on the LSTM unit can extract, from the sequence of time-based vectorized representations, more useful time-correlated keystroke behavior features for keystroke pattern analysis.

It should be understood that FIG. 4 only illustrates one example structure of the LSTM unit. There may be other variant structures. In other embodiments, in addition to the LSTM unit or as an alternative, other model structures suitable for processing sequence information can also be used to configure keystroke pattern verification model 221.

In some embodiments, keystroke pattern verification model 221 may include a single LSTM unit and a corresponding output network layer. The simple network structure allows keystroke pattern verification model 221 to be run by a device with limited computing power, such as being run on a device such as a mobile terminal, or to be run frequently, such as continuously collecting keystroke information to perform verification as the user uses the electronic device. In some embodiments, keystroke pattern verification model 221 may also include a plurality of cascaded LSTM units. This depends on actual application needs.

In some embodiments, output network layer 420 of keystroke pattern verification model 221 may determine whether user 130 performing the typing is a valid (legal) user of electronic device 120 based on the keystroke behavior features. For example, keystroke pattern verification model 221 may be trained to learn the keystroke pattern of a valid user of electronic device 120. The training of keystroke pattern verification model 221 will be discussed in more detail below. If the keystroke behavior features currently extracted from keystroke information 102 do not match the keystroke pattern of a valid user of electronic device 120, output network layer 420 may output corresponding information to indicate such mismatch result. Output network layer 420 may be configured to perform a dichotomy verification based on keystroke behavior features, that is, to divide users into valid users and invalid users. Output network layer 420 may also be configured to provide verification results in other ways to indicate whether user 130 is an invalid user.

In some embodiments, the sequence of characters that are typed sequentially as indicated in keystroke information 102 may also be divided, with a sliding window, into a plurality of character groups that partially overlap with each other. In this way, a plurality of subsequences of time-based vectorized representations for verification can be generated for use in verification. In such an embodiment, keystroke pattern analysis system 110 may further include sequence dividing part 230, as shown in FIG. 2.

Sequence dividing part 230 divides the sequence of characters into a plurality of character groups by using a sliding window with a predetermined character length. Each character group includes a plurality of characters that are typed sequentially in the sequence of characters. In addition, through the sliding window setting, adjacent character groups are caused to include at least one identical character, thus realizing partial overlap between character groups.

Figure 5A:
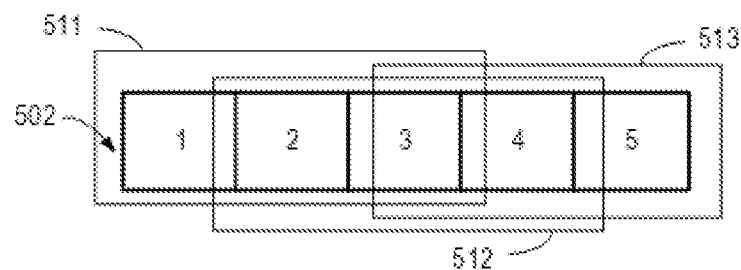
FIGS. 5A and 5B illustrate examples of dividing a plurality of sequences based on a sliding window according to some embodiments of the present disclosure.

As shown in FIG. 5A, a sliding window with a length of 3 characters can be set. Sequence of characters 502 including five characters can be divided into three character groups 511, 512, and 513 through the sliding window. Character group 511 includes the 1st, 2nd, and 3rd characters, character group 512 includes the 2nd, 3rd, and 4th characters, and character group 513 includes the 3rd, 4th, and 5th characters. The overlapping length of adjacent characters can be determined by the length and step size of the sliding window. In the example of FIG. 5A, the step size of the sliding window is 1. Therefore, the adjacent character groups include 2 identical characters. For example, character group 511 and character group 512 both include the 2nd and 3rd characters in sequence of characters 502.

Figure 5B:
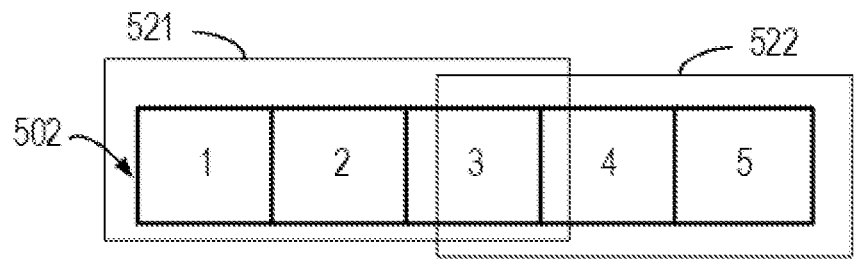

The step size and/or length of the sliding window can also be set to other values to make greater overlap between adjacent character groups. For example, in the example of FIG. 5B, the sliding window still has a length of 3 characters, but its step size is 2. Correspondingly, through the sliding window, sequence of characters 502 can be divided into two character groups 521 and 522, where character group 521 includes the 1st, 2nd, and 3rd characters, and character group 522 includes the 3rd, 4th, and 5th characters. In this example, character groups 521 and 522 include one identical character.

In embodiments in which overlapping character groups are divided, vector encoding part 210 may encode each character and its corresponding time information into a time-based vectorized representation in a similar manner to that discussed above. When performing the keystroke pattern analysis, keystroke pattern analysis part 220 will divide the sequence of time-based vectorized representations into a plurality of subsequences of vectorized representations respectively corresponding to the plurality of character groups. Each subsequence of vectorized representations is used to perform one verification of the keystroke pattern of user 130. For example, each subsequence of vectorized representations may be applied to keystroke pattern verification model 221 as an input to that model. Thus, keystroke pattern analysis part 220 may determine the results of multiple verifications based on multiple subsequences of vectorized representations.

In some embodiments, keystroke pattern analysis part 220 further includes voting verifier 223 for determining final verification result 104 based on the results of the multiple verifications, so as to indicate whether user 130 is verified as a valid user of electronic device 120. In some embodiments, voting verifier 223 may determine the number of times user 130 is verified as a valid user and the number of times the user is verified as an invalid (illegal) user among the results of the multiple verifications. If the number of times user 130 is verified as a valid user is greater, voting verifier 223 determines that user 130 is a valid user. Conversely, if the number of times user 130 is verified as an invalid user is greater, voting verifier 223 determines that user 130 is an invalid user. Of course, voting verifier 223 may also determine verification result 104 based on other voting mechanisms.

By creating partially overlapping character sections, multiple keystroke pattern verifications can be performed on the successive typing of the user, thus avoiding incorrect verification caused by the appearance of new keystroke behavior features of the user in a short period of time and further improving the reliability and accuracy of the verification results.

As will be discussed below with respect to the training process of keystroke pattern verification model 221, the sliding window can also be useful for generating more training data for model training, which is useful given that no additional keystroke information is obtained about the valid user.

Figure 6:
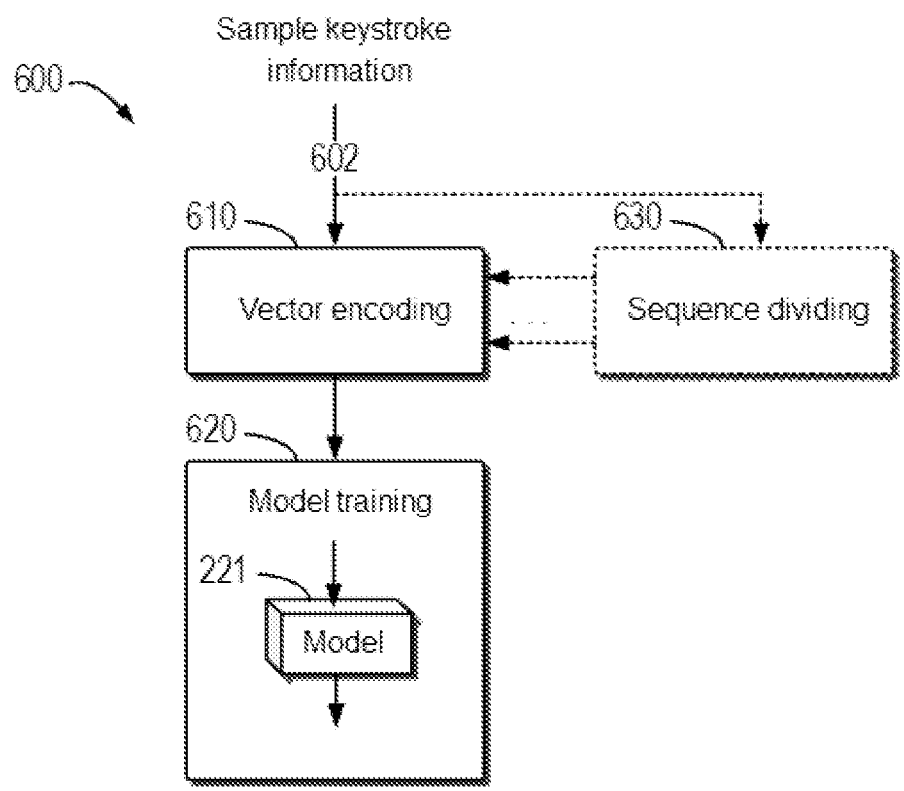
FIG. 6 illustrates a block diagram of an example model training system for training a keystroke pattern verification model according to some embodiments of the present disclosure.

An embodiment in which the keystroke pattern analysis is performed using the trained keystroke pattern verification model 221 has been discussed above, wherein the corresponding capabilities of keystroke pattern verification model 221, including its input and output, have been discussed. The following will continue to discuss how to train or learn keystroke pattern verification model 221 with such capabilities. FIG. 6 illustrates a block diagram of example model training system 600 for training keystroke pattern verification model 221 according to some embodiments of the present disclosure. In some embodiments, keystroke pattern verification model 221 can be trained against a valid user of electronic device 120, so as to learn the keystroke pattern of that valid user. In some embodiments, model training system 600 is implemented on electronic device 120. In other embodiments, model training system 600 may also be implemented on a remote computing system/server of electronic device 120.

The training data of keystroke pattern verification model 221 includes sample keystroke information 602. Sample keystroke information 602 includes the keystroke information typed on electronic device 120 by the valid user of the electronic device, which serves as a positive sample for training. In some embodiments, sample keystroke information 602 may further include randomly obtained keystroke information of other users as a negative sample for training.

As can be understood from the discussion above, the input to keystroke pattern verification model 221 is a series of time-based vectorized representations determined from the keystroke information, and the output is the verification result. During the training of keystroke pattern verification model 221, sample keystroke information 602 may also be processed in a similar manner to that discussed above. Thus, one or more sequences of time-based vectorized representations are extracted from sample keystroke information 602, so as to be used as inputs to keystroke pattern verification model 221 for training. As shown in FIG. 6, model training system 600 includes vector encoding part 610 for performing encoding on each character in sample keystroke information 602 and the corresponding time information to generate the corresponding time-based vectorized representation. The function of vector encoding part 610 is similar to that of vector encoding part 210 discussed above.

In some embodiments, in order to increase the number of training samples to make the model learning more effective, model training system 600 may also include sequence dividing part 630 for dividing the sequence of characters in sample keystroke information 602 into a plurality of character groups that partially overlap each other. Thus, for each character group, vector encoding part 610 may determine the corresponding subsequence of time-based vectorized representations for use as input to keystroke pattern verification model 221. Overlapping character groups can increase the number of inputs used for training, as opposed to dividing character groups that do not overlap each other.

Model training system 600 may further include model training part 620 for performing model training. Model training part 620 may use any suitable machine learning algorithms currently known or to be developed in the future, such as random gradient descent algorithms, backward propagation algorithms, etc., to continuously optimize the set of parameters of keystroke pattern verification model 221 until an optimization or convergence goal is reached. In some embodiments, model training part 620 may use supervised training techniques to train keystroke pattern verification model 221. In the supervised training, the training data may also include a label for each input to keystroke pattern verification model 221, which indicates whether the user corresponding to that input is a valid user.

Figure 7:
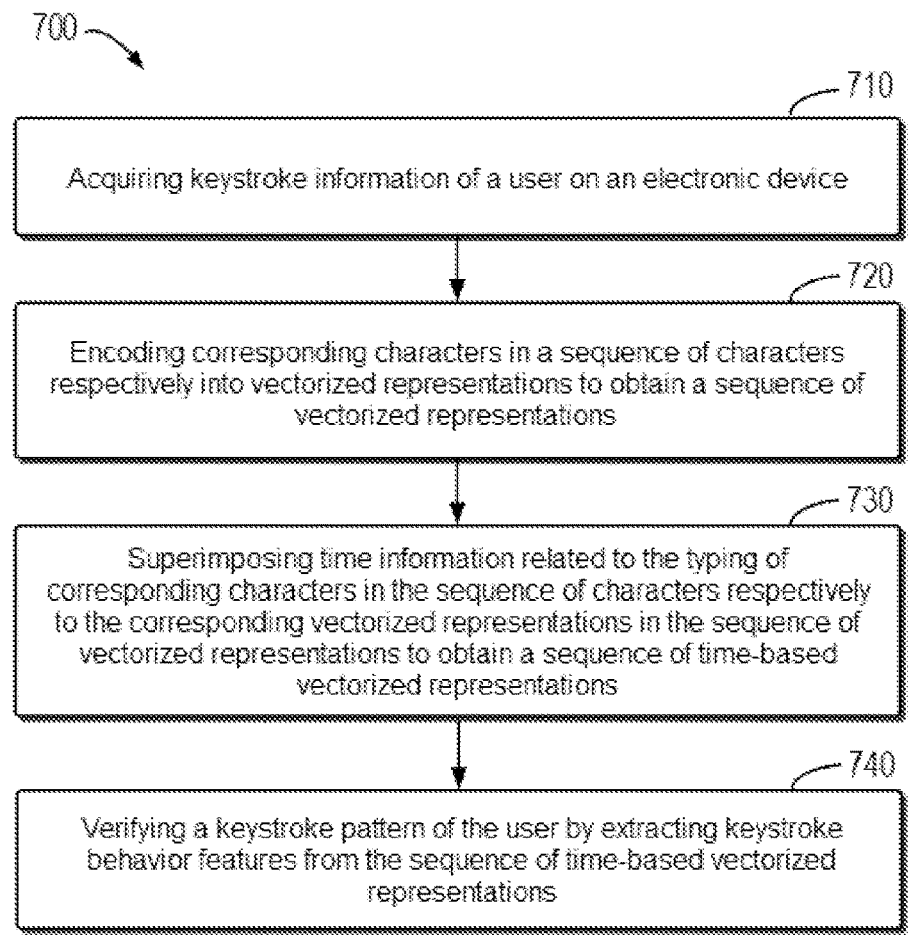
FIG. 7 illustrates a flowchart of a method for keystroke pattern analysis according to some embodiments of the present disclosure.

FIG. 7 illustrates a flowchart of process 700 for keystroke pattern analysis according to embodiments of the present disclosure. Process 700 may be implemented by keystroke pattern analysis system 110 shown in FIG. 1 or FIG. 2. For ease of discussion, process 700 is described from the perspective of keystroke pattern analysis system 110.

In block 710, keystroke pattern analysis system 110 acquires keystroke information of a user on an electronic device. The keystroke information indicates a sequence of characters that are typed sequentially and time information related to the typing of corresponding characters in the sequence of characters.

In some embodiments, for a corresponding character in the sequence of characters, the time information related to the typing of the corresponding character includes at least one of the following: a time when the corresponding character is typed, a time when the typing of the corresponding character is released, a time difference between the time when the corresponding character is typed and the time when an adjacent character is typed, and a time difference between the time when the typing of the corresponding character is released and the time when the typing of the adjacent character is released.

In block 720, keystroke pattern analysis system 110 encodes the corresponding characters in the sequence of characters respectively into vectorized representations to obtain a sequence of vectorized representations, wherein different characters are encoded into different vectorized representations. In some embodiments, keystroke pattern analysis system 110 can encode the corresponding characters in the sequence of characters respectively into the vectorized representations by means of one-hot encoding.

In block 730, keystroke pattern analysis system 110 superimposes the time information related to the typing of the corresponding characters in the sequence of characters respectively to the corresponding vectorized representations in the sequence of vectorized representations to obtain a sequence of time-based vectorized representations.

In some embodiments, superimposing the time information related to the typing of the corresponding characters in the sequence of characters respectively to the corresponding vectorized representations in the sequence of vectorized representations includes: for each of the corresponding characters in the sequence of characters, superimposing a numerical value representing time information related to the typing of the character to a numerical value in a vectorized representation of the character.

In block 740, keystroke pattern analysis system 110 verifies a keystroke pattern of the user by extracting keystroke behavior features from the sequence of time-based vectorized representations.

In some embodiments, keystroke pattern analysis system 110 may divide the sequence of characters into a plurality of character groups by using a sliding window with a predetermined character length. Each character group includes a plurality of characters that are typed sequentially in the sequence of characters, wherein two adjacent character groups in the plurality of character groups include at least one identical character in the sequence of characters. Keystroke pattern analysis system 110 may also divide the sequence of time-based vectorized representations into a plurality of subsequences of vectorized representations respectively corresponding to the plurality of character groups, wherein each subsequence of vectorized representations includes time-based vectorized representations determined from characters included in the plurality of character groups. Keystroke pattern analysis system 110 may also perform a plurality of verifications for the keystroke pattern of the user respectively based on the plurality of subsequences of vectorized representations.

In some embodiments, process 700 may further include: determining, based on the results of the plurality of verifications, whether the user is verified as a valid user for the electronic device.

In some embodiments, keystroke pattern analysis system 110 may use a trained keystroke pattern verification model to extract the keystroke behavior features from the plurality of time-based vectorized representations, so as to verify the keystroke pattern of the user. In some embodiments, the keystroke pattern verification model includes a long short-term memory (LSTM) unit and an output network layer.

Figure 8:
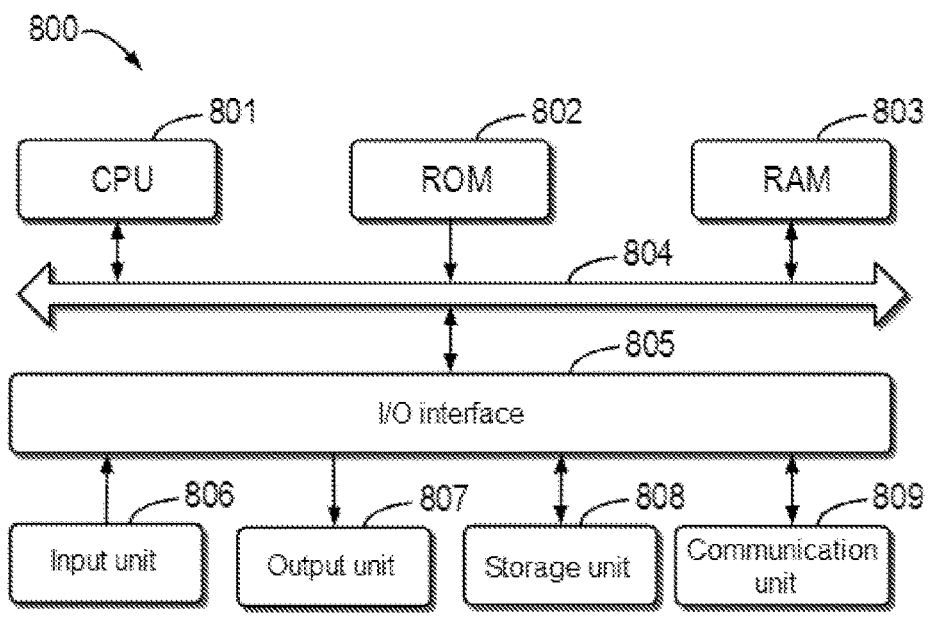
FIG. 8 illustrates a block diagram of an example device that may be configured to implement the embodiments of the present disclosure.

FIG. 8 illustrates a schematic block diagram of example device 800 that can be used to implement the embodiments of the present disclosure. Device 800 may be used to implement process 700 of FIG. 7. Device 800 may be implemented as or included in keystroke pattern analysis system 110 illustrated in FIG. 1 or FIG. 2, or model training system 600 illustrated in FIG. 6.

As shown in the figure, device 800 includes a processing unit, illustratively a central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network, such as the Internet, and/or various telecommunication networks.

CPU 801 performs the various methods and processing described above, such as process 700. For example, in some embodiments, process 700 may be implemented as a computer software program or a computer program product that is tangibly contained in a machine-readable medium, such as a non-transitory computer-readable medium, for example, storage unit 808. In some embodiments, some or all of the computer program may be loaded into and/or installed onto device 800 via ROM 802 and/or communication unit 809. When the computer program is loaded onto RAM 803 and executed by CPU 801, one or more steps of process 700 described above may be performed. Alternatively, in other embodiments, CPU 801 may be configured in any other suitable manners (for example, by means of firmware) to perform process 700.

Those skilled in the art should understand that the steps of the above method of the present disclosure may be implemented by a general-purpose computing apparatus, and may be centralized on a single computing apparatus or distributed over a network composed of a plurality of computing apparatuses. Optionally, they may be implemented using program code executable by a computing apparatus, so that they may be stored in a storage apparatus and executed by a computing apparatus, or they may be made into integrated circuit modules respectively, or they may be implemented by making a plurality of modules or steps thereof into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above may be embodied by further dividing the apparatus into a plurality of apparatuses.

The above description is of illustrative embodiments of the present disclosure, and is not intended to limit the present disclosure. For those skilled in the art, the present disclosure may take on various modifications and alterations. Any modification, equivalent replacement, improvement, and the like made within the spirit and principle of the present disclosure shall be encompassed in the scope of protection of the present disclosure.

What is claimed is:

1. A method for keystroke pattern analysis, including:
   acquiring keystroke information of a user on an electronic device, wherein the keystroke information indicates a sequence of characters that are typed sequentially and time information related to typing of corresponding characters in the sequence of characters;
   encoding corresponding characters in the sequence of characters respectively into vectorized representations to obtain a sequence of vectorized representations, wherein different characters are encoded into different vectorized representations;
   superimposing the time information related to the typing of corresponding characters in the sequence of characters respectively to corresponding vectorized representations in the sequence of vectorized representations to obtain a sequence of time-based vectorized representations; and
   verifying a keystroke pattern of the user by extracting keystroke behavior features from the sequence of time-based vectorized representations;
   wherein superimposing the time information related to the typing of corresponding characters in the sequence of characters respectively to corresponding vectorized representations in the sequence of vectorized representations includes:
   for each of the corresponding characters in the sequence of characters, superimposing a numerical value representing time information related to the typing of the character to a numerical value in a vectorized representation of the character, wherein the superimposing comprises multiplying the numerical value representing the time information and the vectorized representation of the character;
   wherein the keystroke behavior features characterize the keystroke information of the user; and
   wherein verifying a keystroke pattern of the user by extracting keystroke behavior features from the sequence of time-based vectorized representations comprises utilizing a trained keystroke pattern verification model to extract the keystroke behavior features from the sequence of time-based vectorized representations and to compare the extracted keystroke behavior features to a keystroke pattern of a valid user of the electronic device so as to verify the keystroke pattern of the user.

2. The method according to claim 1, wherein the encoding corresponding characters in the sequence of characters respectively into vectorized representations includes:
   encoding the corresponding characters in the sequence of characters respectively into vectorized representations by means of one-hot encoding.

3. The method according to claim 1, wherein for a corresponding character in the sequence of characters, the time information related to the typing of the corresponding character includes at least one of the following:
   a time when the corresponding character is typed,
   a time when the typing of the corresponding character is released,
   a time difference between the time when the corresponding character is typed and the time when an adjacent character is typed, and
   a time difference between the time when the typing of the corresponding character is released and the time when the typing of an adjacent character is released.

4. The method according to claim 1, wherein the verifying a keystroke pattern of the user by extracting keystroke behavior features from the sequence of time-based vectorized representations includes:
   dividing the sequence of characters into a plurality of character groups by using a sliding window with a predetermined character length, wherein each character group includes a plurality of characters that are typed sequentially in the sequence of characters, with two adjacent character groups in the plurality of character groups including at least one identical character in the sequence of characters;
   dividing the sequence of time-based vectorized representations into a plurality of subsequences of vectorized representations respectively corresponding to the plurality of character groups, wherein each subsequence of vectorized representations includes time-based vectorized representations determined from characters included in the plurality of character groups; and performing a plurality of verifications for the keystroke pattern of the user respectively based on the plurality of subsequences of vectorized representations.

5. The method according to claim 4, further including:
determining, based on results of the plurality of verifications, whether the user is verified as a valid user for the electronic device.

6. The method according to claim 1, wherein the keystroke pattern verification model is based on a long short-term memory (LSTM) unit and an output network layer.

7. An electronic device, including:
at least one processor; and
at least one memory storing computer program instructions, wherein the at least one memory and the computer program instructions are configured to cause, together with the at least one processor, the electronic device to perform actions including:
acquiring keystroke information of a user on an electronic device, wherein the keystroke information indicates a sequence of characters that are typed sequentially and time information related to typing of corresponding characters in the sequence of characters;
encoding corresponding characters in the sequence of characters respectively into vectorized representations to obtain a sequence of vectorized representations, wherein different characters are encoded into different vectorized representations;
superimposing the time information related to the typing of corresponding characters in the sequence of characters respectively to corresponding vectorized representations in the sequence of vectorized representations to obtain a sequence of time-based vectorized representations; and
verifying a keystroke pattern of the user by extracting keystroke behavior features from the sequence of time-based vectorized representations;
wherein superimposing the time information related to the typing of corresponding characters in the sequence of characters respectively to corresponding vectorized representations in the sequence of vectorized representations includes:
for each of the corresponding characters in the sequence of characters, superimposing a numerical value representing time information related to the typing of the character to a numerical value in a vectorized representation of the character, wherein the superimposing comprises multiplying the numerical value representing the time information and the vectorized representation of the character;
wherein the keystroke behavior features characterize the keystroke information of the user; and
wherein verifying a keystroke pattern of the user by extracting keystroke behavior features from the sequence of time-based vectorized representations comprises utilizing a trained keystroke pattern verification model to extract the keystroke behavior features from the sequence of time-based vectorized representations and to compare the extracted keystroke behavior features to a keystroke pattern of a valid user of the electronic device so as to verify the keystroke pattern of the user.

8. The electronic device according to claim 7, wherein the encoding corresponding characters in the sequence of characters respectively into vectorized representations includes:
encoding the corresponding characters in the sequence of characters respectively into vectorized representations by means of one-hot encoding.

9. The elecronic device according to claim 7, wherein for a corresponding character in the sequence of characters, the time information related to the typing of the corresponding character includes at least one of the following:
a time when the corresponding character is typed,
a time when the typing of the corresponding character is released,
a time difference between the time when the corresponding character is typed and the time when an adjacent character is typed, and
a time difference between the time when the typing of the corresponding character is released and the time when the typing of an adjacent character is released.

10. The electronic device according to claim 7, wherein the verifying a keystroke pattern of the user by extracting keystroke behavior features from the sequence of time-based vectorized representations includes:
dividing the sequence of characters into a plurality of character groups by using a sliding window with a predetermined character length, wherein each character group includes a plurality of characters that are typed sequentially in the sequence of characters, with two adjacent character groups in the plurality of character groups including at least one identical character in the sequence of characters;
dividing the sequence of time-based vectorized representations into a plurality of subsequences of vectorized representations respectively corresponding to the plurality of character groups, wherein each subsequence of vectorized representations includes time-based vectorized representations determined from characters included in the plurality of character groups; and
performing a plurality of verifications for the keystroke pattern of the user respectively based on the plurality of subsequences of vectorized representations.

11. The electronic device according to claim 10, wherein the actions further include:
determining, based on results of the plurality of verifications, whether the user is verified as a valid user for the electronic device.

12. A computer program product tangibly stored on a non-transitory computer-readable medium and including machine-executable instructions, wherein the machine-executable instructions, when executed, cause an electronic device to perform actions including:
acquiring keystroke information of a user on the electronic device, wherein the keystroke information indicates a sequence of characters that are typed sequentially and time information related to typing of corresponding characters in the sequence of characters;
encoding corresponding characters in the sequence of characters respectively into vectorized representations to obtain a sequence of vectorized representations, wherein different characters are encoded into different vectorized representations;
superimposing the time information related to the typing of corresponding characters in the sequence of characters respectively to corresponding vectorized representations in the sequence of vectorized representations to obtain a sequence of time-based vectorized representations; and
verifying a keystroke pattern of the user by extracting keystroke behavior features from the sequence of time-based vectorized representations;
wherein superimposing the time information related to the typing of corresponding characters in the sequence of characters respectively to corresponding vectorized representations in the sequence of vectorized representations includes:
for each of the corresponding characters in the sequence of characters, superimposing a numerical value representing time information related to the typing of the character to a numerical value in a vectorized representation of the character, wherein the superimposing comprises multiplying the numerical value representing the time information and the vectorized representation of the character;
wherein the keystroke behavior features characterize the keystroke information of the user; and
wherein verifying a keystroke pattern of the user by extracting keystroke behavior features from the sequence of time-based vectorized representations comprises utilizing a trained keystroke pattern verification model to extract the keystroke behavior features from the sequence of time-based vectorized representations and to compare the extracted keystroke behavior features to a keystroke pattern of a valid user of the electronic device so as to verify the keystroke pattern of the user.

13. The computer program product according to claim 12, wherein the encoding corresponding characters in the sequence of characters respectively into vectorized representations includes:
encoding the corresponding characters in the sequence of characters respectively into vectorized representations by means of one-hot encoding.

14. The computer program product according to claim 12, wherein for a corresponding character in the sequence of characters, the time information related to the typing of the corresponding character includes at least one of the following:
a time when the corresponding character is typed,
a time when the typing of the corresponding character is released,
a time difference between the time when the corresponding character is typed and the time when an adjacent character is typed, and
a time difference between the time when the typing of the corresponding character is released and the time when the typing of an adjacent character is released.

15. The computer program product according to claim 12, wherein the verifying a keystroke pattern of the user by extracting keystroke behavior features from the sequence of time-based vectorized representations includes:
dividing the sequence of characters into a plurality of character groups by using a sliding window with a predetermined character length, wherein each character group includes a plurality of characters that are typed sequentially in the sequence of characters, with two adjacent character groups in the plurality of character groups including at least one identical character in the sequence of characters;
dividing the sequence of time-based vectorized representations into a plurality of subsequences of vectorized representations respectively corresponding to the plurality of character groups, wherein each subsequence of vectorized representations includes time-based vectorized representations determined from characters included in the plurality of character groups; and
performing a plurality of verifications for the keystroke pattern of the user respectively based on the plurality of subsequences of vectorized representations.

16. The computer program product according to claim 15, wherein the machine-executable instructions, when executed, cause the electronic device to further perform actions including:
determining, based on results of the plurality of verifications, whether the user is verified as a valid user for the electronic device.

17. The computer program product according to claim 12, wherein the keystroke pattern verification model is based on a long short-term memory (LSTM) unit and an output network layer.

18. The computer program product according to claim 17, wherein responsive to the extracted keystroke behavior features failing to match the keystroke pattern of the valid user of the electronic device, the output network layer outputs corresponding information to indicate the failed match.

19. The electronic device according to claim 7, wherein the keystroke pattern verification model is based on a long short-term memory (LSTM) unit and an output network layer.

20. The electronic device according to claim 19, wherein responsive to the extracted keystroke behavior features failing to match the keystroke pattern of the valid user of the electronic device, the output network layer outputs corresponding information to indicate the failed match.

* * * * *